July 26, 1949.   R. C. BARRETT ET AL   2,477,227
CENTERLESS ROTARY DRUM NUT CRACKING MACHINE
Filed Aug. 22, 1947   3 Sheets-Sheet 1

INVENTORS
ROBERT C. BARRETT
ADOLPHUS A. VAIRA
BY
McMorrow, Berman & Davidson
Attorneys July 26, 1949.  R. C. BARRETT ET AL  2,477,227
CENTERLESS ROTARY DRUM NUT CRACKING MACHINE
Filed Aug. 22, 1947   3 Sheets-Sheet 2
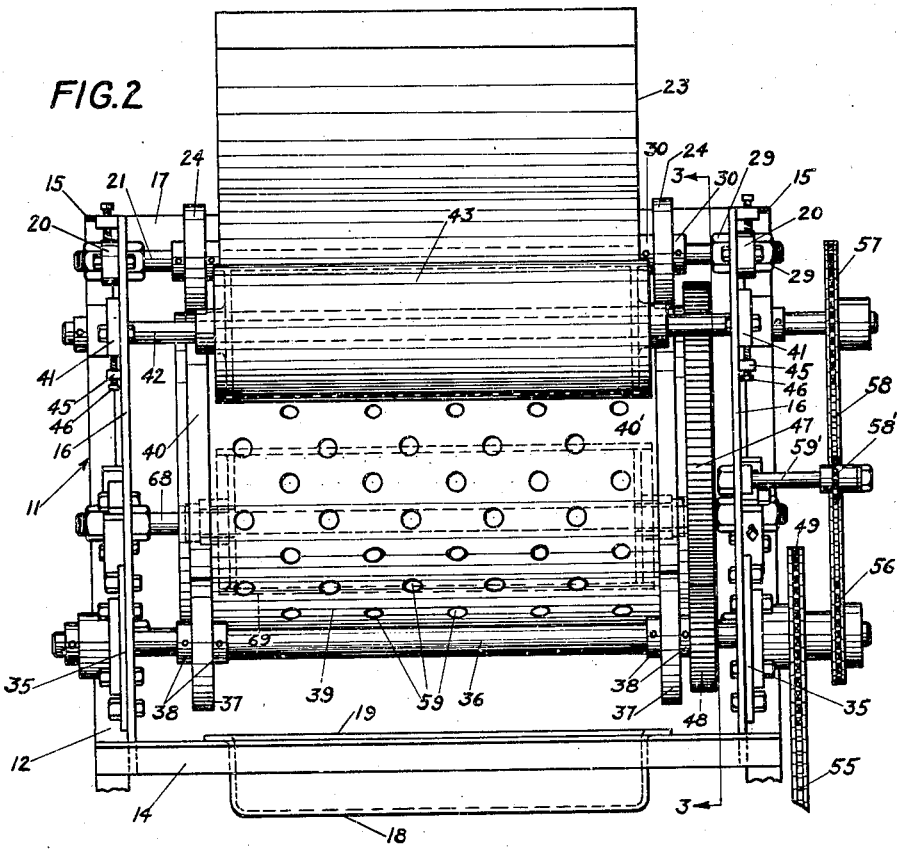
INVENTORS
ROBERT C. BARRETT
BY ADOLPHUS A. VAIRA
McMorrow, Berman & Davidson
Attorneys July 26, 1949.  R. C. BARRETT ET AL  2,477,227
CENTERLESS ROTARY DRUM NUT CRACKING MACHINE
Filed Aug. 22, 1947  3 Sheets-Sheet 3

INVENTORS
ROBERT C. BARRETT
ADOLPHUS A. VAIRA
BY

McMorrow, Berman & Davidson
Attorneys

Patented July 26, 1949

2,477,227

UNITED STATES PATENT OFFICE 2,477,227

CENTERLESS ROTARY DRUM NUT CRACKING MACHINE

Robert C. Barrett and Adolphus A. Vaira, San Jose, Calif.

Application August 22, 1947, Serial No. 770,084

2 Claims. (Cl. 146—11)

This invention relates to centerless rotary drum nut cracking machines, and more particularly to a power driven machine for cracking nuts such as English walnuts, pecans, and the like.

A main object of the invention is to provide a novel and improved nut cracking machine which is very simple in structure, automatic in operation and efficient in performance.

A further object of the invention is to provide an improved nut cracking machine for cracking the shells of English walnuts and the like, wherein the nuts may be fed continuously into the machine and wherein the nuts are carried through the machine and automatically ejected into a collection receptacle after their shells have been cracked, the machine being relatively inexpensive to manufacture, sturdy in construction and reliable in operation.

Further objects and advantages of the invention will become apparent from the following description and claims, and from the accompanying drawings, wherein:

Figure 2 is a fragmentary front elevational view partly in cross-section of the nut cracking machine of Figure 1.

Figure 3 is a detail cross-sectional view taken on line 3—3 of Figure 2.

Figure 4 is a cross-sectional detail view taken on line 4—4 of Figure 3.

Figure 1:
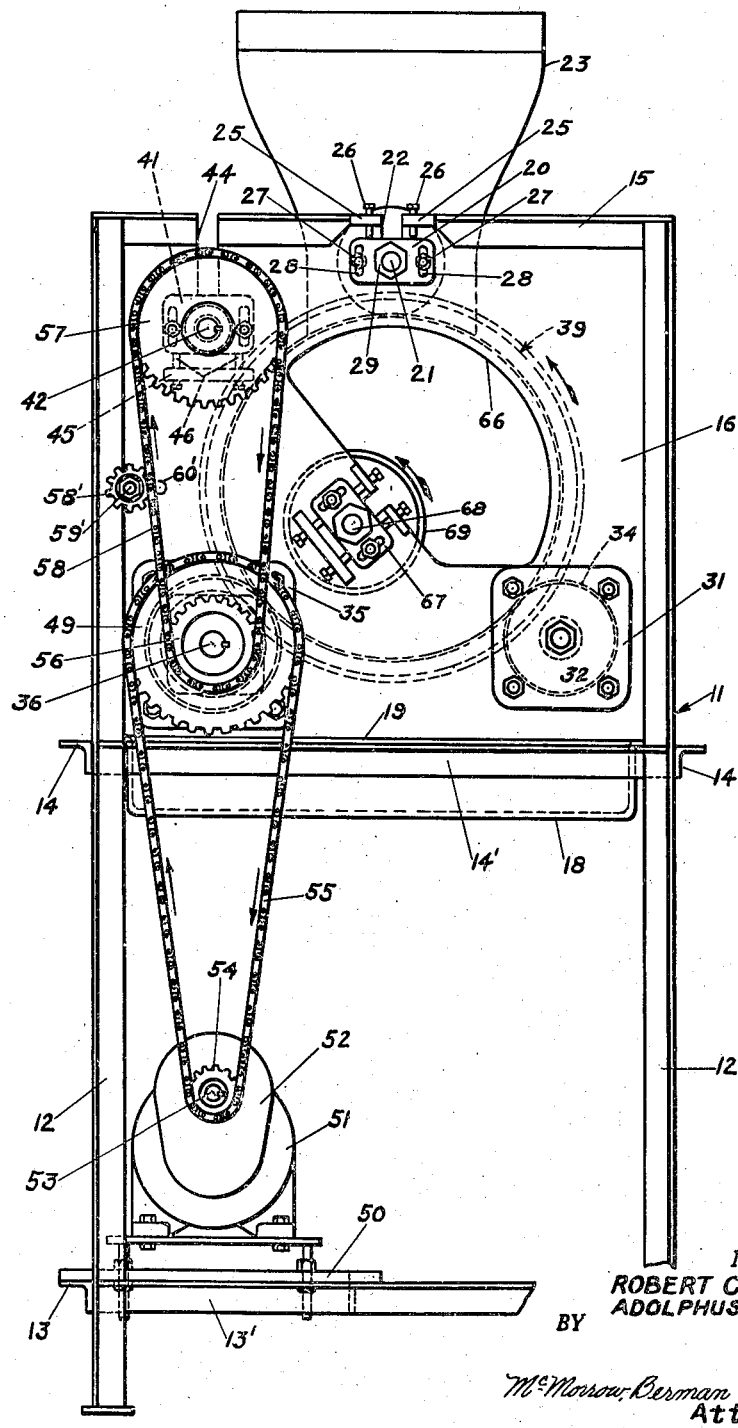
Figure 1 is a side elevational view of a nut cracking machine constructed in accordance with the present invention.

Referring to the drawings, 11 designates a supporting frame, said frame comprising vertical corner posts 12 connected at their lower portions by longitudinal and side horizontal cross bars shown respectively at 13 and 13', and at their intermediate portions by longitudinal and side horizontal cross bars shown respectively at 14 and 14' to define a generally rectangular rigid structure. The upper portion of the frame thus defined is substantially enclosed by side panels 16, 16 and front and rear panels 17 secured to the frame elements of the structure. Supported at the intermediate portion of the structure on the front and rear cross members 14 is a removable tray 18 having horizontal top flanges 19 adapted to rest on the cross members 14 whereby said tray 18 defines a removable bottom pan for the enclosed upper portion of the frame. The top of said enclosed upper portion is stiffened by marginal angle bar elements 15 secured to the top marginal portions of the panels 16 and 17 and to the respective top ends of the corner posts 12.

Adjustably secured to the intermediate upper portions of the side panels 16, 16 are brackets 20, 20 in which is secured a horizontal shaft 21, the top marginal portions of said side panels being vertically notched, as shown at 22 to allow said shaft and the brackets 20, 20 to be withdrawn vertically from the frame structure when the brackets are unfastened from the panels 16, 16 and otherwise allowing said shaft to be adjusted vertically. Mounted on the intermediate portions of shaft 21 is a hopper 23 and journaled on said shaft on each side of the hopper is a roller 24.

The stiffening bars 15 are formed adjacent each notch 22 with spaced lugs 25, 25 through which are threaded stop screws 26, 26 which coact with the top edges of the brackets 20 to establish the uppermost settings of said brackets. The brackets are secured in their desired settings by bolts 27, 27 passing through vertical slots 28, 28 formed in the brackets.

The ends of shaft 21 are secured to the brackets by nuts 29, 29 threaded on the shaft and clamping the shaft to the brackets, the shaft ends passing through the brackets and the nuts 29, 29 clampingly engaging the brackets on each side of said brackets. Secured to shaft 21 on each side of the respective rollers 24, 24 is a collar 30.

Secured to the lower rear portions of the side panels 16, 16 are brackets 31 and secured to said brackets is a horizontal shaft 32. Journalled on shaft 32 between respective pairs of collars 33 secured to said shaft are two rollers 34, each roller being located in the same vertical plane as one of the rollers 24 carried by shaft 21. Secured to the lower forward portions of the side panels 16, 16 are brackets 35, 35 in which is journaled a horizontal shaft 36. Rotatably mounted on shaft 36 in the respective vertical planes of rollers 24, 24 are rollers 37, 37, each roller being positioned between a pair of collars 38, 38 secured on shaft 36.

Supported rotatably at each end on the respective pairs of rollers 34 and 37 is a hollow drum member indicated at 39. Said drum member is formed at its ends with respective grooved tracks 40 and 40' which engage the respective pairs of rollers 37 and 34 with rolling contact whereby said drum is rotatably supported on said rollers as above stated. The rollers 24, 24 carried by shaft 21 also engage the top of said tracks 40 and 40', with rolling contact, thereby retaining the drum member 39 against upward movement. Adjustably secured to the upper forward portions of the side panels 16, 16 are brackets 41, 41, said brackets being fastened to said side panels in the same manner as the brackets 20, 20. Journaled in the brackets 41, 41 is a horizontal shaft 42 carrying a drum 43 which is substantially coextensive in length with and is substantially in rolling contact with the surface of the drum member 39. The stiffening members 15 and the upper marginal portion of the side panels 16, 16 are notched at 44 to receive shaft 42 and to allow vertical adjustment or removal thereof.

Below the brackets 41, 41 the side panels 16, 16 carry flanges 45, 45 through each of which vertical stop screws 46, 46 are threaded, said screws abutting the bottom edges of the respective brackets 41, 41 to limit downward adjustment thereof.

Drum member 39 is integrally formed at one end with a large annular gear 47. Gear 47 is in mesh with a smaller gear 48 carried by shaft 36. Shaft 36 also carried a sprocket wheel 49. Mounted on a plate 50 secured to the forward portions of the cross members 13' and the cross member 13 at the lower forward portion of frame 11 is an electric motor 51. Motor 51 is provided with a speed reduction unit 52, of conventional construction, having a driven shaft 53 on which is secured a small sprocket wheel 54. Sprocket wheel 54 is coupled to sprocket wheel 49 by a sprocket chain 55.

Shaft 36 also carries a sprocket wheel 56 which is substantially smaller than sprocket wheel 49. Shaft 42 carries a sprocket wheel 57 which is coupled to sprocket wheel 56 by a chain 58. Sprocket wheel 57 is substantially larger than sprocket wheel 56. When motor 51 is energized, gear 48 of shaft 36 drives gear 47 of drum member 39, causing the drum member to slowly revolve. At the same time, chain 58 drives shaft 42 causing drum 43 to revolve in rolling contact with drum member 39.

The tension of chain 58 is regulated by an idler sprocket wheel 58' rotatably carried on a shaft 59' adjustably secured to the panel 16 adjacent the chain 58, the idler sprocket wheel 58' engaging the chain 58, as shown in Figure 1. The shaft 59' is secured in a slot 60' formed in the panel and may be adjusted forwardly or rearwardly in said slot to vary the pressure exerted by the idler wheel 58' on chain 58.

Figure 5:
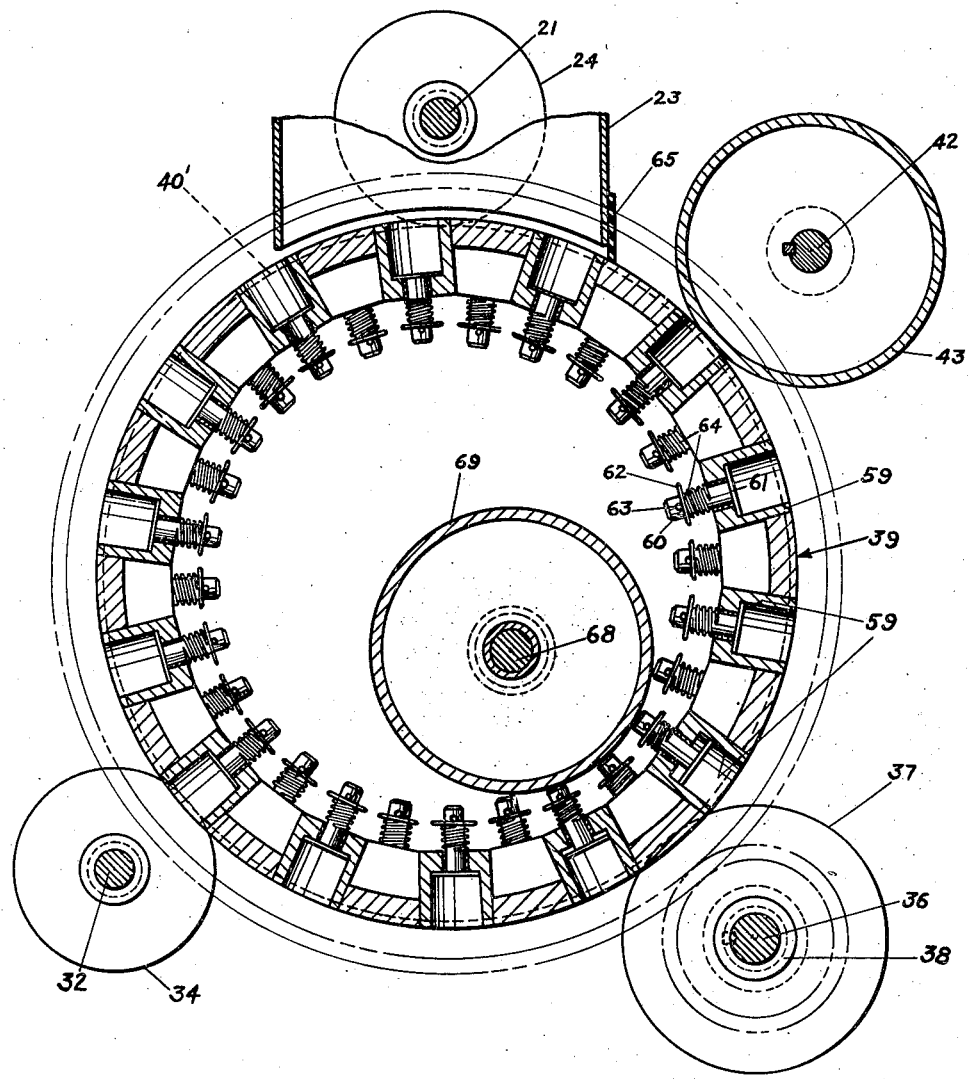
Figure 5 is an enlarged vertical cross-sectional detail view taken transversely through the main carrier drum of the machine of Figure 1.

As shown in Figure 5, the drum member 39 is provided with cup members 59 spaced uniformly over its surface, each cup member being generally cylindrical and having its axis directed radially to the axis of rotation of said drum member and having a generally cylindrical internal bore. Axially slidable in the bottom wall of each cup member and projecting internally of the drum member is a rod 60 carrying a plunger disc 61 in the bore of the cup member. A washer 62 is mounted on each rod 60 and is retained thereon by a pin 63 passing transversely through the rod. A coiled spring 64 encircles each rod 60 and bears between the washer 62 thereon and the bottom wall of the associated cup member 59, biasing the plunger disc 61 thereof to a retracted position against the bottom wall surface in the bore of the cup member. When the plunger disc 61 is in this retracted position the cup member will just receive a nut, such as an English walnut, with the long diameter of the nut positioned axially in the cup member and a small portion of the nut projecting beyond the peripheral outer cylindrical surface of the drum member 39. The nuts are fed onto the drum member 39 from hopper 23 and fall into the cup members 59 in the above described positions as said cup members move slowly past the bottom of the hopper. The rear edge of the hopper carries a depending brush strip 65 of resilient material, such as rubber, which sweeps the nuts to proper axial positions in the cup members if they have not already found such positions when they move past said brush member 65. The nuts are cracked as their exposed portions are engaged by the roller 43 subsequent to passing the brush strip 65.

Each side panel 16 is formed with an enlarged aperture 66 and adjustably secured to each side panel adjacent the lower forward edge of the aperture 66 is a bracket 67. Secured to the brackets 67 is a horizontal shaft 68 parallel to but downwardly and forwardly spaced from the axis of drum member 39. Journaled on shaft 68 inside the drum member 39 is a drum 69. As the ends of the rods 60 move downwardly responsive to rotation of the drum member 39, said ends engage the surface of drum 69, causing the rods to be pushed outwardly from their normal positions. The plunger discs 61 carried by the rods therefore advances outwardly in their bores, ejecting the cracked nuts carried therein and causing said cracked nuts to drop into the collection pan 18. When the rods 60 have moved past the surface of drum 69 they resume their normal positions due to the biasing action of their springs 64.

In operation, the nuts are merely placed in the hopper 23 and the motor 51 is energized. The machine gathers the nuts from the bottom of the hopper and moves them in the cup members 59 to the cracking roll 43 where they are cracked by the endwise pressure exerted thereon by said cracking roll. When the cracked nuts have moved past said cracking roll 43 they are automatically ejected by the co-action of the inner ends of the rods 60 with the cam roll 69 as the nuts approach the bottom of the drum member 39. This operation continues as long as there are any nuts in the hopper 23.

Ordinarily, the cracked nut shells drop off the kernels as the nuts drop from the drum member 39 into the collection pan 18 so that very little further labor is required to separate the kernels from the shells.

In place of the removable pan 18, a conventional conveyor belt may be employed to continuously remove the cracked nuts from the machine to the next succeeding station for further operations thereon.

While a specific embodiment of a nut cracking machine for cracking English walnuts and the like has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a rotary nut cracking machine comprising a frame, a rotatable drum in the frame having a plurality of radial nut-receiving sockets in the peripherial surface thereof, individual nut ejectors located in the sockets with inwardly-extending operating ends projecting radially inward into said drum, springs mounted upon said operating ends within the interior of the drum biasing the ejectors radially inward to the bottoms of the socket, a cracking cylinder rotatably mounted in the frame adjacent to the upper portion of said drum substantially in rolling contact therewith, and cam means in said frame for engaging against and moving the operating ends of said ejectors to raise the latter upon being brought into contact with the cam means upon rotation of said drum, the features which include a hopper located in said frame above the top of said drum, a supporting shaft rotatably mounted in said frame and extending rotatably through the hopper to support the latter above said drum, there being drive means for rotating the cracking roller and drum, supporting rollers mounted upon said shaft externally of said hopper and rotatably rolling upon said drum, means for rotatably supporting the latter, and a cam roller rotatably mounted in said frame in effective position to rotate within said drum and form the cam means engaging against the operating ends of the nut-ejectors.

2. In a rotary nut cracking machine comprising a frame, a rotatable drum in the frame having a plurality of radial nut-receiving sockets in the pheripheral surface thereof, individual nut ejectors located in the sockets with inwardly-extending operating ends projecting radially inward into said drum, springs mounted upon said operating ends within the interior of the drum biasing the ejectors radially inward to the bottoms of the sockets, a cracking cylinder rotatably mounted in the frame adjacent to the upper portion of said drum substantially in rolling contact therewith, and cam means in said frame for engaging against and moving the operating ends of said ejectors to raise the latter upon being brought into contact with the cam means upon rotation of said drum, the features which include a hopper located in said frame above the top of said drum, a supporting shaft rotatably mounted in said frame and extending rotatably through the hopper to support the latter above said drum, there being drive means for rotating the cracking roller and drum, supporting rollers mounted upon said shaft externally of said hopper and rotatably rolling upon said drum, means for rotatably supporting the latter, a cam roller rotatably mounted in said frame in effective position to rotate within said drum and form the cam means engaging against the operating ends of the nut ejectors, a pair of substantially parallel shafts rotatably mounted in said frame in spaced apart relation below the axis of the drum, supporting rollers mounted on the latter pair of shafts beneath said drum in supporting rolling contact therewith, a roller of relatively small diameter with respect to that of the drum forming the cracking roller, and a relatively large cylindrical centerless member open at both ends forming the rotatable drum, the cam roller being disposed intermediate said pair of parallel shafts and the supporting shaft of the hopper, there being drive means for rotating the cracking roller and also rotating one of said parallel shafts and thereby rotate said drum.

ROBERT C. BARRETT.
ADOLPHUS A. VAIRA.

REFERENCES CITED

The following references are of record in the file of this patent:

UNITED STATES PATENTS

| Number | Name | Date |
|---|---|---|
| 1,038,339 | Gabbett-Fairjax | Sept. 10, 1912 |
| 1,439,694 | Cooper | Dec. 26, 1922 |
| 1,469,641 | Grimes | Oct. 2, 1923 |
| 2,428,157 | Healy | Sept. 30, 1947 |